United States Patent
Liao et al.

(10) Patent No.: US 11,176,705 B2
(45) Date of Patent: Nov. 16, 2021

(54) METHOD FOR OPTIMIZING CAMERA LAYOUT FOR AREA SURVEILLANCE AND APPARATUS EMPLOYING THE METHOD

(71) Applicant: Shenzhen Fugui Precision Ind. Co., Ltd., Shenzhen (CN)

(72) Inventors: Chang-Ching Liao, New Taipei (TW); Shao-Wen Wang, New Taipei (TW); Shih-Cheng Wang, New Taipei (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 23 days.

(21) Appl. No.: 16/814,029

(22) Filed: Mar. 10, 2020

(65) Prior Publication Data

US 2021/0287400 A1  Sep. 16, 2021

(51) Int. Cl.
| | |
|---|---|
| *G06T 7/80* | (2017.01) |
| *G06T 7/73* | (2017.01) |
| *G06T 7/246* | (2017.01) |
| *G06T 17/05* | (2011.01) |

(52) U.S. Cl.
CPC ............. *G06T 7/75* (2017.01); *G06T 7/251* (2017.01); *G06T 17/05* (2013.01); *G06T 2207/30196* (2013.01); *G06T 2207/30232* (2013.01)

(58) Field of Classification Search
CPC . G06T 11/60; G06T 7/44; G06T 7/004; A63B 24/0062; H04N 7/181; H04N 13/0253; H04N 13/0246; G06K 9/00255; G06K 9/00201
See application file for complete search history.

(56) References Cited

U.S. PATENT DOCUMENTS

| | | | | |
|---|---|---|---|---|
| 2015/0297949 | A1* | 10/2015 | Aman | ............ G06T 7/246 348/157 |
| 2015/0339537 | A1 | 11/2015 | Ikeda | |
| 2019/0279008 | A1 | 9/2019 | Abhau et al. | |

FOREIGN PATENT DOCUMENTS

| | | |
|---|---|---|
| CN | 104469322 A | 3/2015 |
| CN | 110246211 A | 9/2019 |
| TW | 201424345 A | 6/2014 |

\* cited by examiner

*Primary Examiner* — Phuoc H Doan

(74) *Attorney, Agent, or Firm* — ScienBiziP, P.C.

(57) ABSTRACT

A method for optimizing camera layout for areas requiring surveillance comprises constructing a three-dimensional model of a scene subject to surveillance and related scene variables, configuring a computation range, constructing a plurality of simulation scenes using the three-dimensional model and the scene variables and recording the framing of pixels in the plurality of simulation scenes by a plurality of cameras according to the computation range, and further calculating the number of pixels required for visibility of an object to be recognized from the recorded framing of pixels. A camera set is selected from the plurality of cameras according to a convergence requirement, and a computation as to camera optimization layout is performed with the camera set to obtain one or more layout schemes.

18 Claims, 3 Drawing Sheets

METHOD FOR OPTIMIZING CAMERA LAYOUT FOR AREA SURVEILLANCE AND APPARATUS EMPLOYING THE METHOD

FIELD

The subject matter herein generally relates to image recognition.

BACKGROUND

With a sharp rise of computer calculation capabilities and various image recognition algorithms, the use of image recognition to meet various surveillance needs has become a key technology for the security technology area. Since image surveillance requires fast image-based recognition, optimal position and angle of camera layout are important to improve the efficiency of image recognition.

Especially in environments of large space, such as industrial factories, airports, and railway stations, etc., where complicated situations of human-machine crossover occurs regularly, a more rapid and comprehensive camera layout method is needed to meet the requirements of various surveillance situations.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
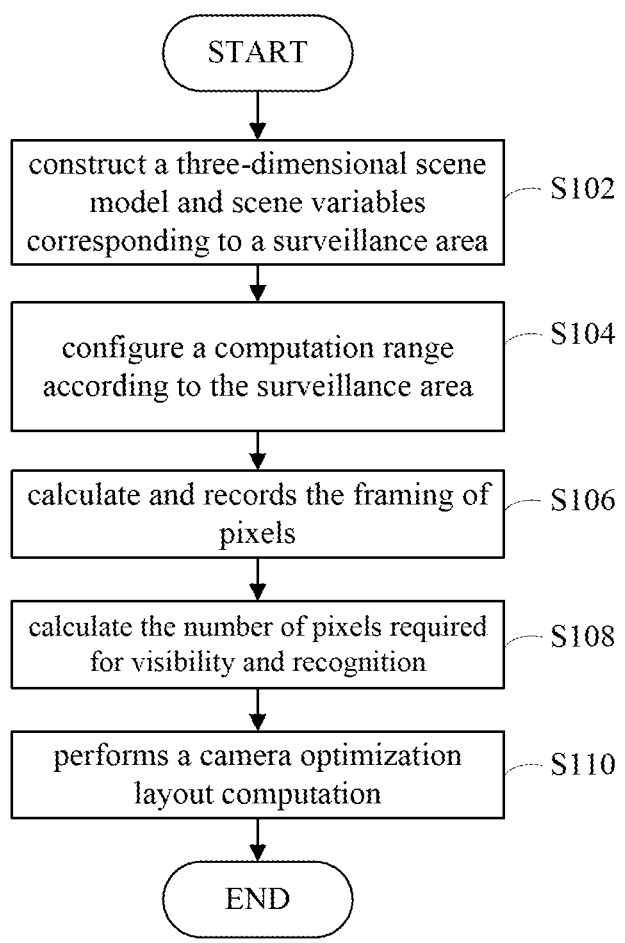
FIG. 1 is a flowchart of one embodiment of a method for optimizing camera layout.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM).

The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a flowchart of a method for optimizing camera layout applied in an apparatus according to an embodiment. The method can be implemented in any suitable hardware, software, firmware, or combination thereof.

In step S102, a three-dimensional scene model and scene variables are constructed corresponding to a surveillance area. The scene variables may comprise those of a static scene and those of a dynamic scene.

Taking a hazardous zone within a factory as an example of the surveillance area, where the static scene variables comprise static objects in the surveillance area, such as locations of walls, pillars, and light sources, and the dynamic scene variables comprise objects in motion in the surveillance area, such as robots, robotic arms, and all possible motions of such moving objects and any other objects to be recognized. In the embodiment, a surveillance requirement is for the benefit of operators in the hazardous zone, and human shapes are the objects to be recognized in the surveillance area.

In step S104, a computation range is configured according to the surveillance area and/or a surveillance requirement. In the embodiment, the computation range may be configured according to the surveillance requirement. In one embodiment, the computation range configuration comprises a layout requirement configuration, a surveillance range configuration, and a coordination range configuration for operators. Specifically, before computing an optimal layout, the surveillance area can be configured according to the surveillance requirement, and a coordinate system corresponding to the surveillance area can be established by drawing a grid in the three-dimensional scene model corresponding to the surveillance area. A distance between two coordinate points can be set according to the surveillance requirement or motions of the operators.

In one embodiment, the layout requirement configuration comprises a layout range configuration, a layout spacing configuration, and lens specifications for a plurality of cameras, such as high or low resolution, wide angle, etc. In one embodiment, the surveillance range configuration comprises horizontal and vertical range configurations according to the surveillance requirement. Before calculating the framing of pixels at different angles within the plurality of cameras, the configured surveillance area is firstly checked to reduce a computing load. In one embodiment, the surveillance range can exclude areas where the operators cannot reach, such as areas behind pillars, or areas without a surveillance requirement. For example, the layout range of the plurality of cameras can be configured as 0 to 0.5 meters beyond the surveillance area, the surveillance range can be configured as 10 meters multiples 10 meters multiples 5 meters within the surveillance area, and the coordinate range can be configured with 0.5 meters spacing according to a distance kept by the operators during working.

In step S106, the three-dimensional scene model and the scene variables are imported, a plurality of simulation scenes is constructed based on the three-dimensional scene model and the scene variables, the framing of pixels of the plurality of simulation scenes captured by the plurality of cameras at different camera angles is calculated and recorded.

In one embodiment, an exhaustive method can be used to construct the plurality of simulation scenes to compute and record the framing of pixels of the plurality of cameras at different camera angles. For example, the plurality of simulation scenes may be constructed by various permutations and combinations of the static scene variables and the dynamic scene variables. If the objects to be recognized are operators during working time, then the plurality of simulation scenes simulates various actions of different operators while working at various coordinate points within the surveillance area. Different operators may wear different clothing and perform different actions, such as protective clothing, work gloves, and helmets, they may be reaching, stretching, standing, bending, squatting, sitting, stepping up or down, or working as a team. The static scene variables and the dynamic scene variables are in relation to the objects to be recognized. For example, the static objects can comprise walls, pillars, and light sources, and the static scene variables can comprise locations of the walls, sizes and locations of the pillars, and locations of the light sources. The dynamic objects can comprise robots and robotics arms, and the dynamic scene variables can comprise sizes, locations, and motion trajectories of the robots and the robotic arms.

In step S108, the number of pixels required for visibility and recognition of the objects to be recognized is calculated according to the recorded framing of pixels for each of the plurality of cameras. Specifically, when performing image recognition, the less obscure that each part of an object to be recognized is, the better. That is, during the image recognition, the larger the number of pixels for higher visibility of objects to be recognized the better. Taking a human shape as an example, the number of pixels required for visibility and basic recognition of a human form can be counted.

In step S110, a camera optimization layout computation is performed. In one embodiment, the camera optimization layout computation comprises a best angle for each of the plurality of cameras, a convergence computation, and a best combination of cameras.

In one embodiment, the best camera angle for each camera can be obtained by calculating a sum of pixels required for visibility and recognition of the object to be recognized in the plurality of simulations scenes under different camera angles, and then selecting the one with pixels providing maximum visibility as the best camera angle. In one embodiment, the convergence computation comprises sorting the plurality of cameras according to the sum of pixels at the best camera angle, and sequentially selecting a set of cameras meeting a convergence limitation from the plurality of cameras. In one embodiment, the convergence limitation is that a potentially recognizable object has less than a predetermined threshold of clarity at each coordinate point. For example, when the object to be recognized is a human shape and the predetermined threshold of clarity is set as 0.8, it means that 80% of the human shape must be available for recognition. In one embodiment, the value of the predetermined threshold of clarity can be adjusted according to the surveillance requirement. In one embodiment, the rate of recognizability of the object to be recognized can be calculated as: (the number of pixels for visibility of the object/the total number of pixels for completeness of the object). In one embodiment, according to the layout requirement, such as cost considerations, and the number of cameras deployed, a subset of cameras is selected from the set of cameras in order to perform permutation and combination until the combination of the cameras can capture all coordinate points in the surveillance area. For example, after the convergence computation, the number of sets of cameras is twelve but the layout requirement is three cameras, the method then randomly selects three cameras from the twelve cameras to find the best combination of cameras that can view all the coordinate points and meet the cost considerations at the same time.

In one embodiment, the camera optimization layout computation may generate a plurality of layout schemes. The method may display layout parameters comprising camera deployment locations, camera angles, and other parameters through a three-dimensional simulation layout scene for a user's reference. For example, in a factory environment, the user is a factory layout designer.

Figure 2:
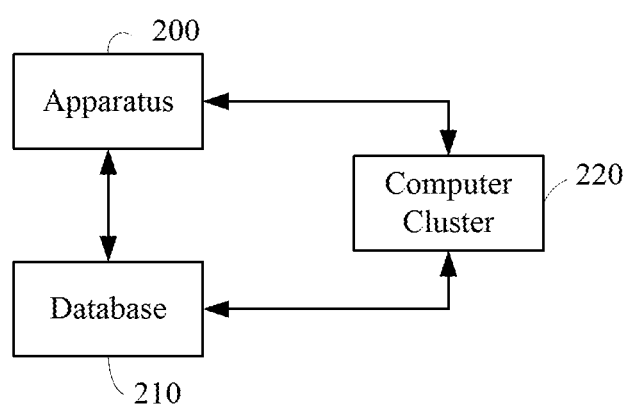
FIG. 2 is a block diagram of one embodiment of arrangement of an apparatus for optimizing camera layout.

FIG. 2 illustrates an apparatus 200 according to an embodiment. The apparatus 200 can execute the method for optimizing camera layout as shown in FIG. 1. Because the storage capability and the computing capability of the apparatus 200 are limited by hardware, the apparatus 200 is connected to a database 210 and a computer cluster 220, stores part or all of the data required for the method in the database 210, and transfers part or all of the required computation load to the computer cluster 220.

Figure 3:
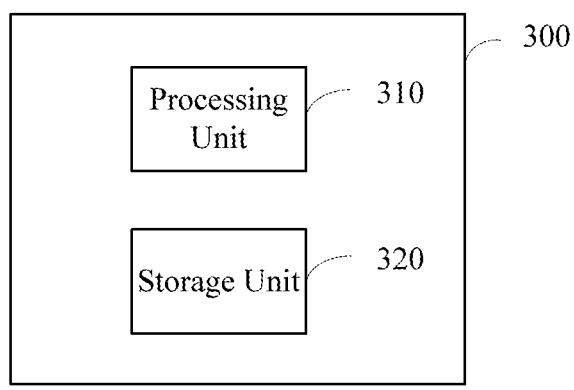
FIG. 3 is a block diagram of one embodiment of the apparatus for optimizing camera layout.

FIG. 3 illustrates an apparatus 300 according to another embodiment. The apparatus 300 comprises a processing unit 310, and a storage unit 320. The processing unit 310 is electrically connected to the storage unit 320. The processing unit 310 comprises a microcontroller, a microprocessor, or other circuits with arithmetic processing capabilities, and is configured to execute or process instructions, data, and computer programs stored in the storage unit 320. The storage unit 320 comprises a read-only memory (ROM), a random access memory (RAM), a magnetic disk storage medium device, an optical storage medium device, a flash memory device, electrical, optical, or other physical/tangible (e.g., non-transitory), etc. A computer-readable storage medium is used to store one or more computer programs that control the operation of the apparatus 300, and is executed by the processing unit 310. In the embodiment, the storage unit 320 stores or encodes one or more computer programs, and stores model, configuration, and computing parameter data, for the processing unit 310, to execute the method shown in FIG. 1.

The camera layout method and apparatus of the present disclosure reduce load in computing the optimal layout of the plurality of cameras with the three-dimensional scene model corresponding the surveillance area, perform pixel analysis for each camera in terms of object visibility, and quickly find the best combination of cameras to meet the surveillance requirement and the layout requirement. When the camera layout method is used in a suitable environment, the method can effectively not only recognize target objects, but also avoid the excessive or insufficient camera deployment.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for optimizing camera layout applied in an apparatus, the method comprising:
constructing a three-dimensional scene model and scene variables corresponding to a surveillance area;
configuring a computation range according to the surveillance area;
constructing a plurality of simulation scenes based on the three-dimensional scene model and the scene variables;
calculating and recording a plurality of framing of pixels of the plurality of simulation scenes captured by a plurality of cameras at different camera angles;
calculating the number of pixels required for visibility and recognition of an object to be recognized according to the plurality of framing of pixels;
selecting a set of cameras from the plurality of cameras according to a convergence limitation; and
performing a camera optimization layout computation according to the set of cameras and a layout requirement to generate at least one camera layout scheme;
wherein a method of configuring a computation range comprises: establishing a coordinate system corresponding to the surveillance area and setting a distance between any two points in the coordinate system according to a surveillance requirement.

2. The method of claim 1, further comprising: displaying the at least one camera layout scheme through a three-dimensional simulation layout scene.

3. The method of claim 1, wherein the scene variables comprise static scene variables and dynamic scene variables.

4. The method of claim 3, wherein the static scene variables comprise a location of a wall, a size and a location of a pillar, and a location of a light source.

5. The method of claim 3, wherein the dynamic scene variables comprise motions of a moving object and motions of the object to be recognized.

6. The method of claim 1, wherein the object to be recognized is a human.

7. The method of claim 1, wherein a method of configuring a computation range further comprises:
configuring a layout range, a layout spacing, and lens specifications for the plurality of cameras; and
configuring a horizontal surveillance range and a vertical surveillance range based on the surveillance area and the surveillance requirement.

8. The method of claim 1, wherein a method of calculating the number of visible pixels of the object to be recognized according to the recorded framing pixels comprises:
calculating a sum of pixels required for visibility and recognition of the object to be recognized in the plurality of simulation scenes under different camera angles for each of the plurality of cameras, and selecting one camera angle with the maximum sum of the visible pixels to be the best camera angle for the camera.

9. The method of claim 1, wherein the layout requirement is the number of cameras needs to be deployed.

10. An apparatus, the apparatus comprising:
a processing unit; and
a storage unit for storing at least one computer program, wherein the computer program comprises instructions which are executed by the processing unit, and performs a method comprising:
constructing a three-dimensional scene model and scene variables corresponding to a surveillance area;
configuring a computation range according to the surveillance area;
constructing a plurality of simulation scenes based on the three-dimensional scene model and the scene variables;
calculating and recording a plurality of framing of pixels of the plurality of simulation scenes captured by a plurality of cameras at different camera angles;
calculating the number of pixels required for visibility and recognition of an object to be recognized according to the plurality of framing of pixels;
selecting a set of cameras from the plurality of cameras according to a convergence limitation; and
performing a camera optimization layout computation according to the set of cameras and a layout requirement to generate at least one camera layout scheme;
wherein a method of configuring a computation range further comprises: establishing a coordinate system corresponding to the surveillance area and setting a distance between any two points in the coordinate system according to a surveillance requirement.

11. The apparatus of claim 10, wherein the method further comprises: displaying the at least one camera layout scheme through a three-dimensional simulation layout scene.

12. The apparatus of claim 10, wherein the scene variables comprise static scene variables and dynamic scene variables.

13. The apparatus of claim 12, wherein the static scene variables comprise a location of a wall, a size and a location of a pillar, and a location of a light source.

14. The apparatus of claim 12, wherein the dynamic scene variables comprise motions of a moving object and motions of the object to be recognized.

15. The apparatus of claim 10, wherein the object to be recognized is a human.

16. The apparatus of claim 10, wherein a method of configuring a computation range further comprises:
configuring a layout range, a layout spacing, and lens specifications for the plurality of cameras; and
configuring a horizontal surveillance range and a vertical surveillance range based on the surveillance area and the surveillance requirement.

17. The apparatus of claim 10, wherein a method of calculating the number of visible pixels of the object to be recognized according to the recorded framing pixels further comprises:
calculating a sum of pixels required for visibility and recognition of the object to be recognized in the plurality of simulation scenes under different camera angles for each of the plurality of cameras, and selecting one camera angle with the maximum sum of the visible pixels to be the best camera angle for the camera.

18. The apparatus of claim 10, wherein the layout requirement is the number of cameras needs to be deployed.

* * * * *